(12) United States Patent
Nagai

(10) Patent No.: US 7,457,475 B2
(45) Date of Patent: Nov. 25, 2008

(54) EDGE DETECTING APPARATUS, NOISE ELIMINATING APPARATUS, EDGE DETECTING METHOD, AND NOISE ELIMINATING METHOD AND PROGRAM

(75) Inventor: Takahiro Nagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 673 days.

(21) Appl. No.: 10/910,625

(22) Filed: Aug. 4, 2004

(65) Prior Publication Data
US 2005/0058348 A1 Mar. 17, 2005

(30) Foreign Application Priority Data
Aug. 6, 2003 (JP) .................... P2003-287265

(51) Int. Cl.
G06K 9/40 (2006.01)
G06K 9/48 (2006.01)
G06K 9/36 (2006.01)

(52) U.S. Cl. .................. 382/266; 382/199; 382/240; 382/260

(58) Field of Classification Search ........... 382/275, 382/199, 266–269, 280–281, 166, 276, 260, 382/240
See application file for complete search history.

(56) References Cited

U.S. PATENT DOCUMENTS

| 5,425,114 | A | * | 6/1995 | Hamasaki et al. ........... 382/254 |
| 5,917,955 | A | * | 6/1999 | Kojima ....................... 382/266 |
| 6,148,115 | A | * | 11/2000 | Mackinnon et al. ......... 382/266 |
| 6,370,279 | B1 | * | 4/2002 | Paik ............................ 382/268 |
| 6,418,242 | B1 | * | 7/2002 | Maurer ....................... 382/266 |
| 6,477,279 | B2 | * | 11/2002 | Go .............................. 382/240 |
| 6,748,113 | B1 | * | 6/2004 | Kondo et al. ................ 382/232 |
| 6,771,793 | B1 | * | 8/2004 | Yamada ...................... 382/264 |
| 6,847,737 | B1 | * | 1/2005 | Kouri et al. ................. 382/260 |
| 6,985,636 | B1 | * | 1/2006 | Semenchenko ............. 382/266 |
| 7,106,386 | B2 | * | 9/2006 | Kobayashi .................. 348/625 |
| 7,151,858 | B2 | * | 12/2006 | Kyong ........................ 382/266 |
| 2005/0058365 | A1 | * | 3/2005 | Wang et al. ................. 382/266 |

FOREIGN PATENT DOCUMENTS

| JP | 6-260889 | 9/1994 |
| JP | 7-236142 | 9/1995 |
| JP | 11-17954 | 1/1999 |

OTHER PUBLICATIONS

Lee et al, "Multiresolution gradient-based edge detection in noisy images using wavelet domain filters", Society of Photo-Optical Instrumentation Engineers, 39(9) 2405-2412 (Sep. 2000).*

* cited by examiner

Primary Examiner—Andrew W. Johns
Assistant Examiner—Andrae S Allison
(74) Attorney, Agent, or Firm—Oblon, Spivak, McClelland, Maier & Neustadt, P.C.

(57) ABSTRACT

In an edge detecting apparatus and a noise eliminating apparatus, low AC components are detected from frequency components obtained by orthogonally transforming an image signal in rectangular units. Edge components are included in the low AC components among the frequency components. Based on this characteristic, based on the result of detecting the low AC components, in a rectangular-unit image corresponding to the low AC components, it is determined whether edge components corresponding to the low AC components are included in a rectangular unit image, and an edge direction is detected if the edge components are included. This enables ensured detection of edge components in any portions of a screen.

16 Claims, 17 Drawing Sheets

EDGE DETECTING APPARATUS, NOISE ELIMINATING APPARATUS, EDGE DETECTING METHOD, AND NOISE ELIMINATING METHOD AND PROGRAM

BACKGROUND OF THE INVENTION

1. Field of the Invention

The present invention relates to a technical field to which digital image processing pertains. In particular, the present invention relates to an edge detecting apparatus suitable for use in detecting edge components of an image. In addition, the present invention relates to an edge detecting method and program which realize technology for the edge detecting apparatus, and also to, a noise eliminating apparatus, and noise eliminating method and program to which technologies represented by the method and program are applied.

2. Description of the Related Art

Edge detecting technology is used not only in extracting an image edge (outline), but also in improving image quality by enhancing an image edge.

In this technology, noise is simultaneously enhanced depending on an edge enhancing technique. Accordingly, conventionally, various techniques have been attempted.

By way of example, the technique disclosed in Japanese Unexamined Patent Application Publication No. 8-163408 has been proposed by the present assignee. This technique finds an enhanced signal from a secondary differential value of an input image signal. By multiplying the enhanced signal by a noise coefficient, a corrected enhanced signal is obtained. In addition, by performing smoothing in an edge direction (perpendicular to a luminance changing direction), image quality is improved.

In the various techniques, a dedicated circuit for edge detection must be additionally provided. This causes a problem of an increase in circuit size. In addition, in the various techniques, uniform control is only performed for the entirety of a screen such as a frame or field. Thus, processing for each part of the image cannot be performed.

SUMMARY OF THE INVENTION

The present invention has been made in view of the above problems. It is an object of the present invention to solve the above problems.

According to an aspect of the present invention, an edge detecting apparatus is provided which includes a first unit for detecting low alternating-current (AC) frequency components from frequency components obtained by orthogonally transforming an image signal in rectangular units, and a second unit for detecting, from the low AC frequency components, edge components corresponding to the low AC frequency components, the edge components being included in an image in one rectangular unit.

According to another aspect of the present invention, a noise eliminating apparatus is provided which includes a first unit for detecting low AC frequency components from frequency components obtained by orthogonally transforming an image signal in rectangular units, a second unit for detecting, from the low AC frequency components, edge components corresponding to the low AC frequency components, the edge components being included in an image in one rectangular unit, and a third unit for controlling a first control value to be less than a second control value, the first control value being used to act on frequency components in a direction in which the detected edge components are included in the image, the second control value being used to act on frequency components in directions other than the direction. Noise in the image is eliminated by using noise canceling components obtained in the control.

According to another aspect of the present invention, an edge detecting method is provided which includes the steps of detecting low AC frequency components from frequency components obtained by orthogonally transforming an image signal in rectangular units, and detecting, from the low AC frequency components, edge components corresponding to the low AC frequency components, the edge components being included in an image in one rectangular unit.

According to another aspect of the present invention, a noise eliminating method is provided which includes the steps of detecting low AC frequency components from frequency components obtained by orthogonally transforming an image signal in rectangular units, detecting, from the low AC frequency components, edge components corresponding to the low AC frequency components, the edge components being included in an image in one rectangular unit, controlling a first control value to be less than a second control value, the first control value being used to act on frequency components in a direction in which the detected edge components are included in the image, the second control value being used to act on frequency components in directions other than the direction, and eliminating noise in the image by using noise canceling components obtained in the control.

According to another aspect of the present invention, a program is provided. The program allowing a computer to execute the functions of detecting low AC frequency components from frequency components obtained by orthogonally transforming an image signal in rectangular units, and detecting, from the low AC frequency components, edge components corresponding to the low AC frequency components, the edge components being included in an image in one rectangular unit.

According to another aspect of the present invention, a program is provided. The program allowing a compute to execute the functions of detecting low AC frequency components from frequency components obtained by orthogonally transforming an image signal in rectangular units, detecting, from the low AC frequency components, edge components corresponding to the low AC frequency components, the edge components being included in an image in one rectangular unit, controlling a first control value to be less than a second control value, the first control value being used to act on frequency components in a direction in which the detected edge components are included in the image, the second control value being used to act on frequency components in directions other than the direction, and eliminating noise in the image by using noise canceling components obtained in the control.

According to an edge detecting apparatus of the present invention, by image edge components from AC components obtained by performing orthogonal transformation in rectangular units, it can be ensured that edge components are detected in any portion of a screen.

In addition, the edge detecting apparatus detects the edge components by using the frequency components obtained by performing orthogonal transformation in rectangular units. Accordingly, the need to provide a dedicated edge detecting apparatus is eliminated, thus enabling a reduction in circuit size compared with the related art.

According to a noise eliminating apparatus of the present invention, image edge components are detected from AC components obtained by performing orthogonal transformation in rectangular units, and a first control value is controlled to be less than a second control value, the first control value being used to act on frequency components in a direction in which the detected edge components are included in the image, the second control value being used to act on frequency components in directions other than said direction. This can suppress noise while storing the noise components. Therefore, improvement in image quality is realized.

According to a noise eliminating apparatus of the present invention, edge components are detected by using frequency components obtained by performing orthogonal transformation in rectangular units, and are used to generate noise canceling components. Thus, the need to provide a dedicated edge detecting circuit is eliminated, thus enabling a reduction in circuit size compared with the related art.

DESCRIPTION OF THE PREFERRED EMBODIMENTS

Various forms of the present invention are described below with reference to the accompanying drawings.

1. Edge Detecting Apparatus

Figure 1:
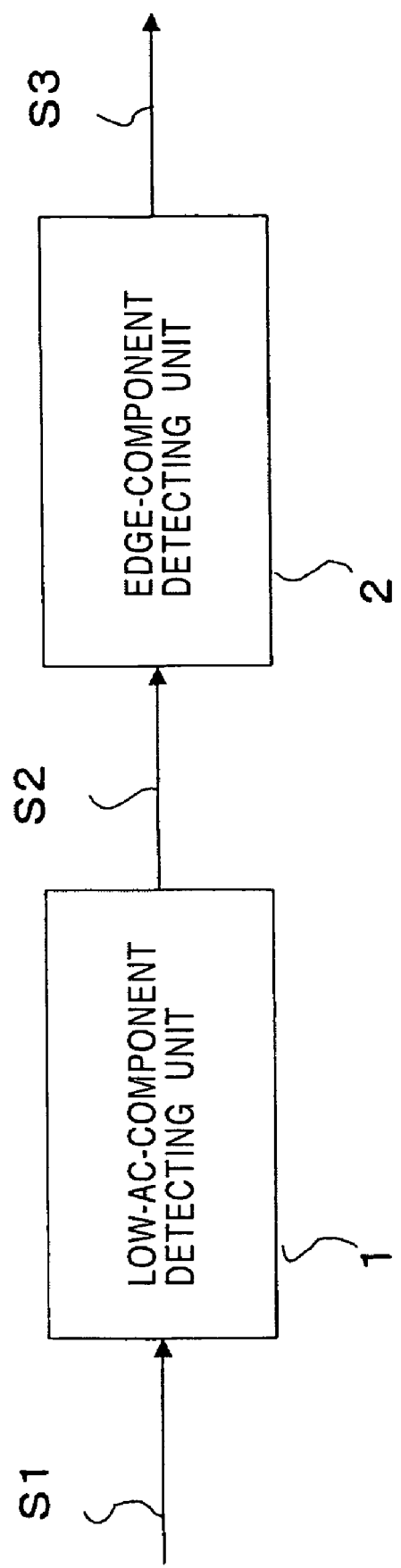
FIG. 1 is a block diagram showing a form of an edge detecting apparatus of the present invention.

FIG. 1 shows an edge detecting apparatus according to a form of the present invention. This edge detecting apparatus mainly has two functional units.

One of the functional units is a low-AC-component detecting unit 1 that detects low AC components S2 from frequency components obtained by orthogonally transforming an image signal S1 in rectangular units.

The other functional unit is an edge-component detecting unit 2 that detects, from the low AC components S2, edge components S3 which are included in an image in one rectangular unit and which correspond to the low AC components S2.

It is possible for the image signal S1 to be, for example, a composite video signal, each channel signal in YC separation signals, each channel signal of component signals (three-channel signals such as RGB or YR-YB-Y signals), or the like.

Rectangular units represent partial images constituting the entire screen (field or frame). Each rectangular unit is represented by, in general, the number of pixels in the vertical direction of a screen, which is represented by "m (natural number)", and the number of pixels in the horizontal direction of the screen, which is represented by "n (natural number)". The rectangular unit is hereinafter referred to as an m×n-size image block. For example, an 8×8 size and a 4×8 size are used.

As the orthogonal transformation, one of transformation methods that transform an image from spatial coordinates into frequency coordinates is used.

A discrete cosine transform (DCT), Walsh-Hadamar transform (WHM), a discrete fourier transform (DFT), discrete sine transform (DST), a Haar transform, a slant transform, a Karhunen-Loeve transform (KLT), or another type of orthogonal transform can be used.

Figure 2:
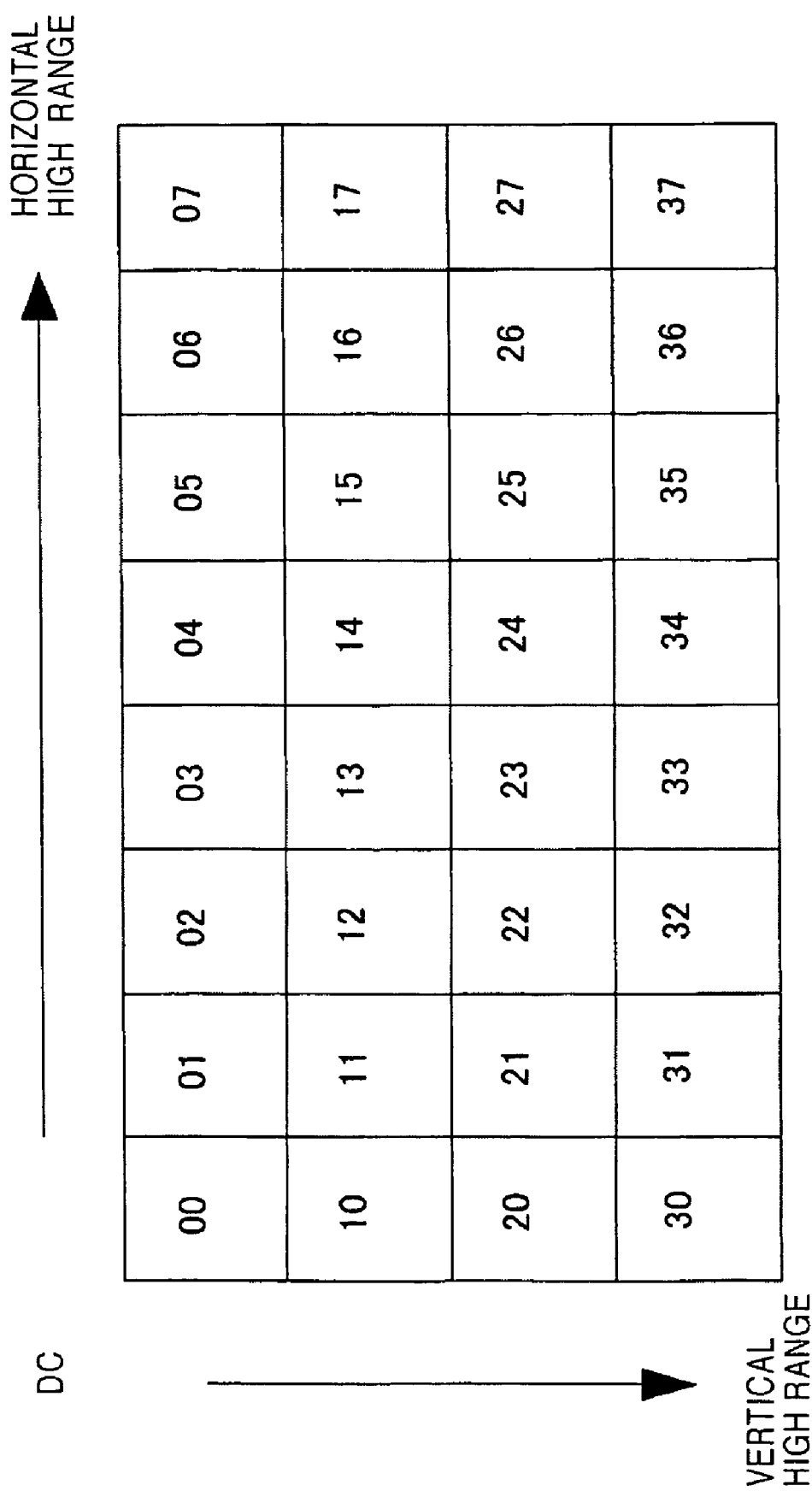
FIG. 2 is a diagram illustrating a two-dimensional frequency plane.

The low AC components are AC components around the vicinity of a DC component. The reason that the values of low AC components are detected is that, among edge components on the screen, those affecting image quality are considered as appearing as low AC components on frequency coordinates. For example, as shown in FIG. 2, when horizontal frequency components are arranged on a horizontal axis, and vertical frequency components are arranged on a vertical axis, edge components appear as, for example, the values of the coordinates (01), (11), and (10).

In the horizontal low AC component (coordinates (01)), a vertical edge component appears. In the vertical low AC component (coordinates (10)), a horizontal edge component appears. In addition, in the horizontal and vertical low AC component (coordinates (11)), an oblique edge component appears.

Accordingly, by detecting these pairs of coordinates, it can be determined whether there is an edge, and based on a coordinate position in which an edge is detected, also an edge direction can be found. As a reference value for use in detection, in general, an appropriate value set in accordance with experience and experiment is used.

The number of low AC component values to be detected does not always need to be one in each direction. For example, a plurality of low AC component values can be detected in each direction. In the case of detecting low AC component values, weighted values (including simple addition) of the low AC component values may be used as detected values, or a weighted average (including a simple average) of the low AC component values may be detected as each of detected values. Alternatively, values obtained through another processing technique may be used as detected values. It is determined which technique should be employed by considering the influence of the technique on image quality.

In addition, in the case of determining the number of low AC components to be detected, the number of pixels can also be set in accordance with the shape of the rectangular unit. For example, when the shape of the rectangular unit is a square in which the number of vertical pixels and the number of horizontal pixels are equal, the number of low AC components may be equal in each direction. For example, when the shape of the rectangular unit is a rectangle in which the number of vertical pixels and the number of horizontal pixels differ from each other, in a longer side direction, low AC components more than those in a shorter side direction can be used as components to be detected.

In other words, different numbers of low AC components may be detected in accordance with directions in which low AC components are to be detected. In this manner, detecting accuracies between directions can be set to be substantially equivalent.

2. Noise Eliminating Apparatus

Figure 3:
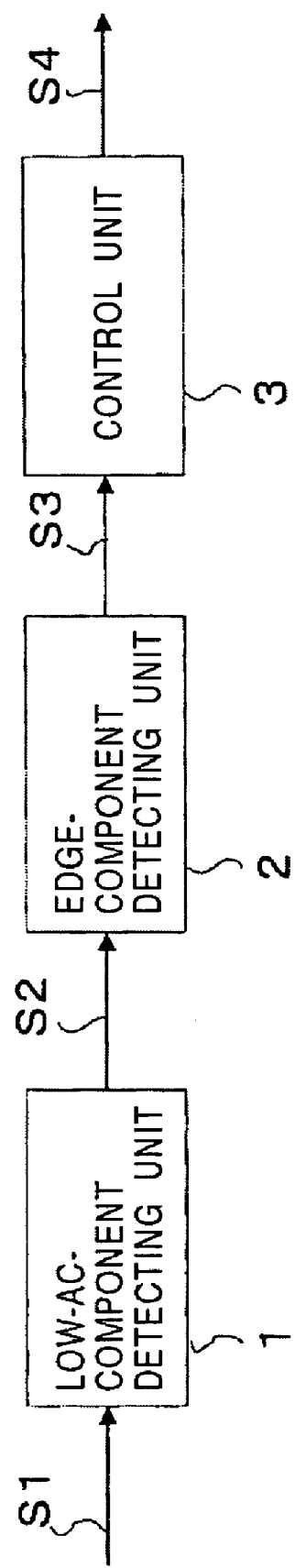
FIG. 3 is a block diagram showing a form of a noise eliminating apparatus of the present invention.

A noise eliminating apparatus according to another form of the present invention is shown in FIG. 3. This noise eliminating apparatus mainly has three functional units. Among the three functional units, two functional units are similar to those described above. Specifically, a low-AC-component detecting unit 1 and an edge-component detecting unit 2 are used.

The other functional unit is a control unit 3. In the control unit 3, control value S4 which is to operate on frequency components in a direction including detected edge components is controlled to be smaller than control value S3 which is to operate on frequency components in the other directions.

The control unit 3 functions to decrease a noise canceling component generated in an edge-detected direction to be smaller than that generated in a direction in which no edge is detected. In other words, in the noise eliminating apparatus, noise is eliminated from the image such that noise canceling components are finally added to (or subtracted from) an input image signal. In the elimination, the control unit 3 functions to relatively decrease a canceling value in a direction including the edge. Because this prevents the edge component from being decreased simultaneously with the noise. Such control is performed in rectangular units.

For noise cancellation using the noise canceling components, either a method of directly eliminating noise components from frequency components obtained by orthogonal transformation, or a method of eliminating noise from an image signal obtained by inverse orthogonal transformation on the noise canceling components may be used.

The control value which is to operate on frequency components in a direction other than a direction in which edge components are detected is used as a reference control value for frequency components in the direction in which the edge components are detected. An operating element for a frequency component to be controlled is a function that allows only a frequency component having a particular signal level to pass. The function is called the coring function. As the coring function, a known coring function can be used.

When it is determined that no noise is included, coring is not performed, or the control value is adjusted so that the noise canceling component is set to be substantially zero. In other words, when it is determined that no noise is included, the input image signal is output in unchanged form as an output from the noise eliminating apparatus.

The control value in this case operates to transform the coring function by increasing or decreasing a parameter of the coring function. For example, the control value operates to enlarge or reduce the form of the coring function in an amplitude (vertical) direction. Also, for example, it operates to transform the form of the coring function in a horizontal direction.

The control value may be given by using a look-up table, or may be given by calculation (e.g., addition or subtraction). A function determining the control value may be given by either a linear function or nonlinear (curve) function.

Figure 4:
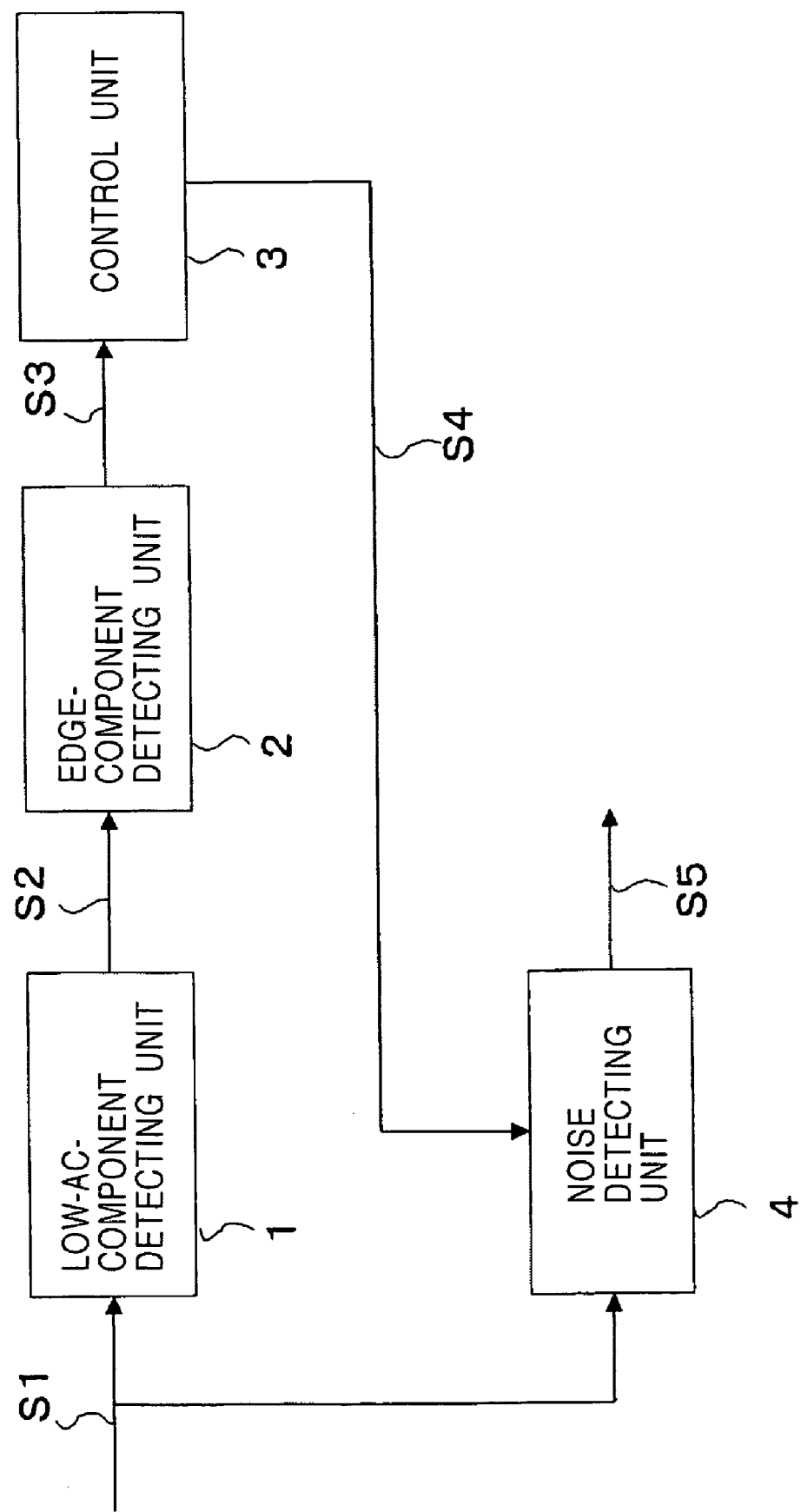
FIG. 4 is a block diagram showing a more preferred form of a noise eliminating apparatus of the present invention.

As FIG. 4 shows, a noise eliminating apparatus according to a form of the present invention may further include the following functional unit. The functional unit is a noise detecting unit 4 that, by using the coring function transformed in accordance with the control value S4, extracts noise components from the frequency components by orthogonally transforming the image signal S1 in rectangular units, and outputs the extracted components as noise canceling components S5. The detection in the noise detecting unit 4 may be performed for all channels, or may be performed for some of the channels.

Figure 5:
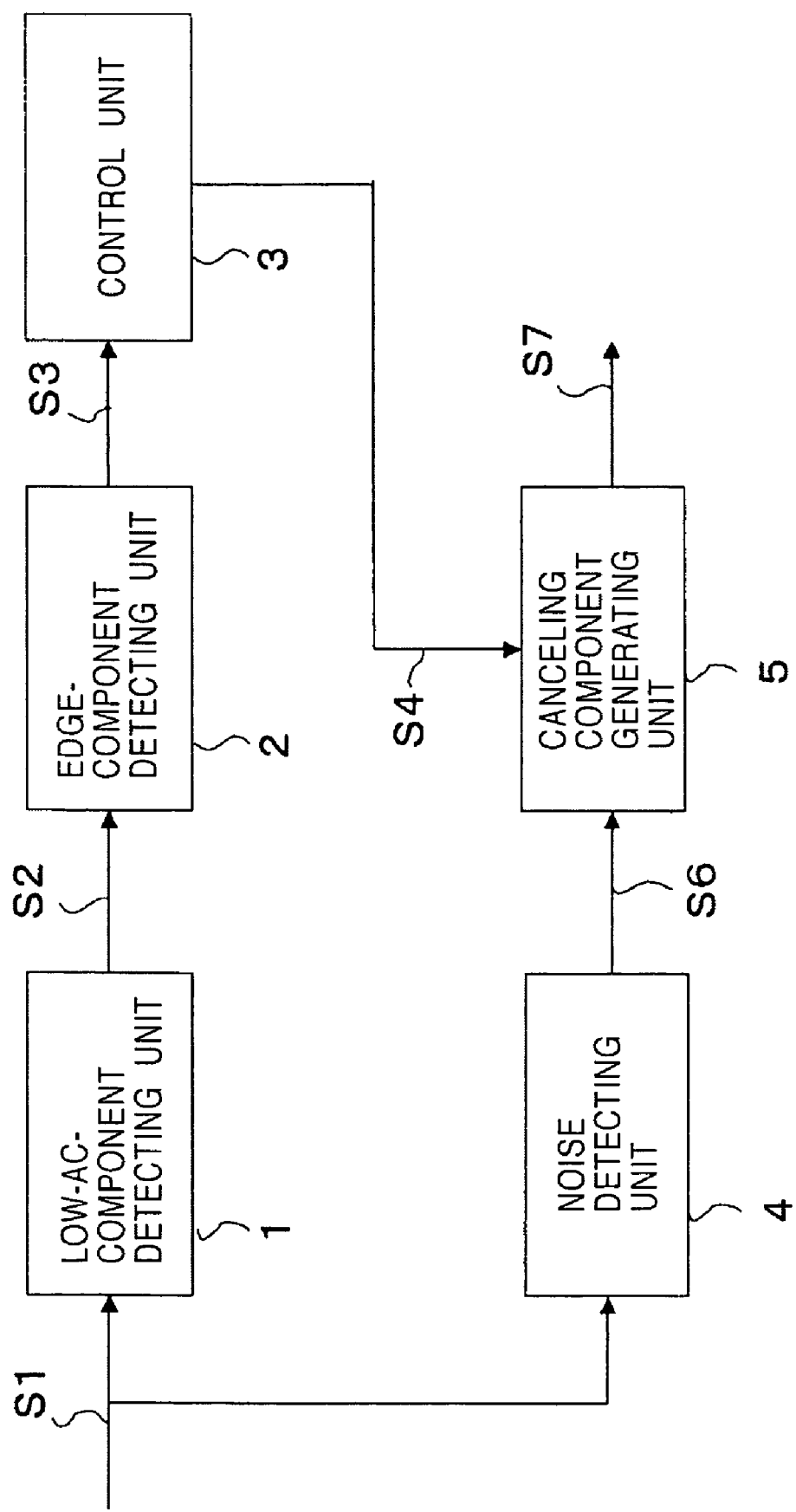
FIG. 5 is a block diagram showing another preferred form of a noise eliminating apparatus of the present invention.

As FIG. 5 shows, a noise eliminating apparatus according to a form of the present invention may further include the following two functional units.

One functional unit is a noise detecting unit 4 that detects noise components S6 from the frequency components obtained by orthogonally transforming the image signal S1 in rectangular units.

The other functional unit is a canceling component generating unit 5 which allows the control value S4 to operate on the detected noise components S6, and which outputs, as noise canceling components S7, the noise components transformed in accordance with the control value S4.

In the case of the noise detecting unit 4, the form of the coring function is fixed. This is a difference from the noise eliminating apparatus shown in FIG. 4 in which the form of the coring function is controlled. The canceling component generating unit 5 functions to increase or decrease the amplitude of the noise components S6, which are input, in accordance with the control value S4. For example, the canceling component generating unit 5 is formed by, for example, a multiplier.

3. Other Points

The present invention is not limited to the above-described edge detecting apparatuses and noise eliminating apparatuses, but can be directed to processing methods and programs used therewith.

Noise eliminating apparatuses according to embodiments of the present invention are described below.

Features which are not particularly shown or described in this specification may be selected from among those known in the technical field of the present invention.

The following description is directed to the case of realizing preferred embodiments in the form of hardware. However, the preferred embodiments may be realized by a computer program equivalent to the hardware.

When the present invention is realized in the form of a computer program, the program is stored in a computer-readable recording medium.

The types of storage medium include, for example, a magnetic storage medium such as a magnetic disk (e.g., a flexible disk or hard disk) or a magnetic tape, an optical storage medium such as an optical disk, an optical tape, or a machine-readable bar code, a semiconductor storage device such a random access memory (RAM) or a read-only memory (ROM), and another physical device or medium for use in storing a computer program.

In the case of realizing the present invention in the form of hardware, the present invention may be realized in the form an integrated circuit, such as an application specific integrated circuit (ASIC), or in the form of a known means in the technical field of the present invention.

I. Conceptual Configuration of Noise Eliminating Apparatus

Figure 6:
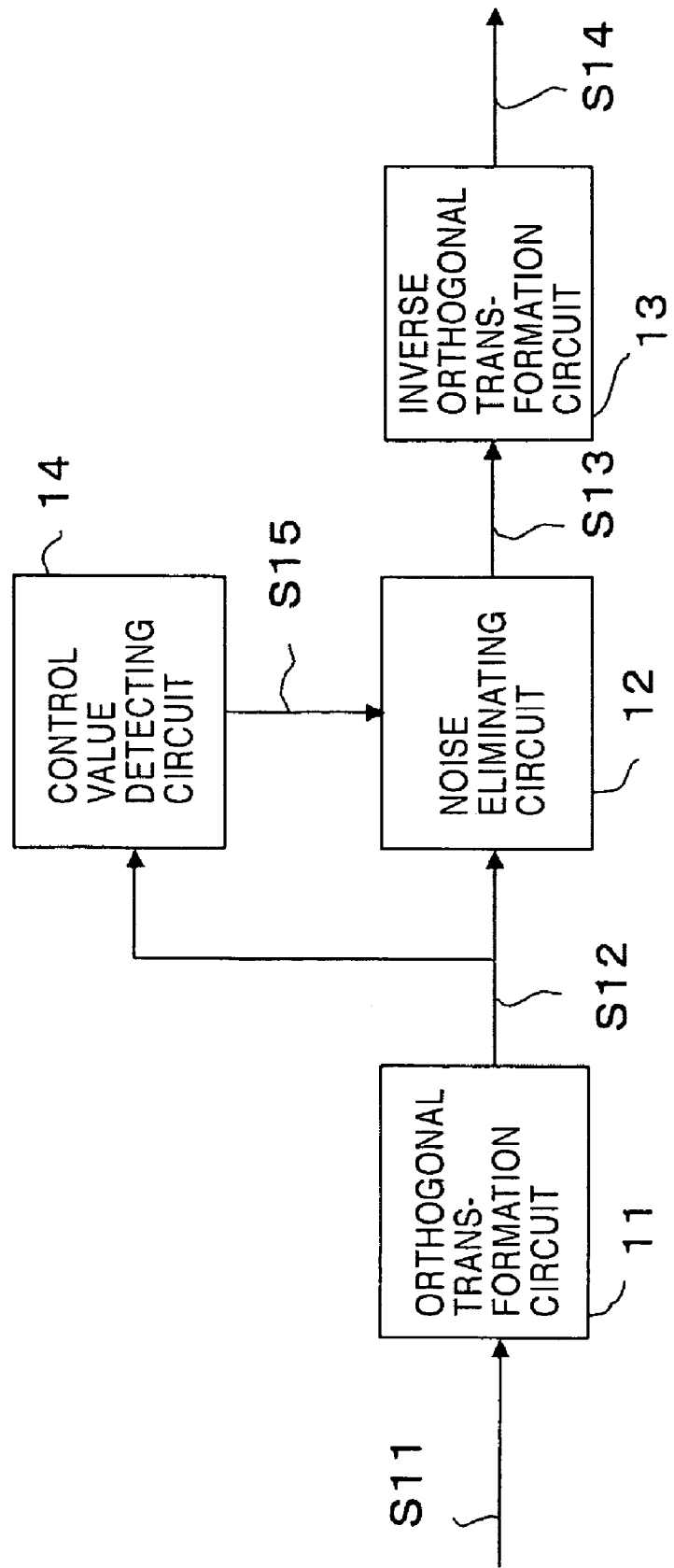
FIG. 6 is a schematic block diagram showing the first configuration of a noise eliminating apparatus.
Figure 7:
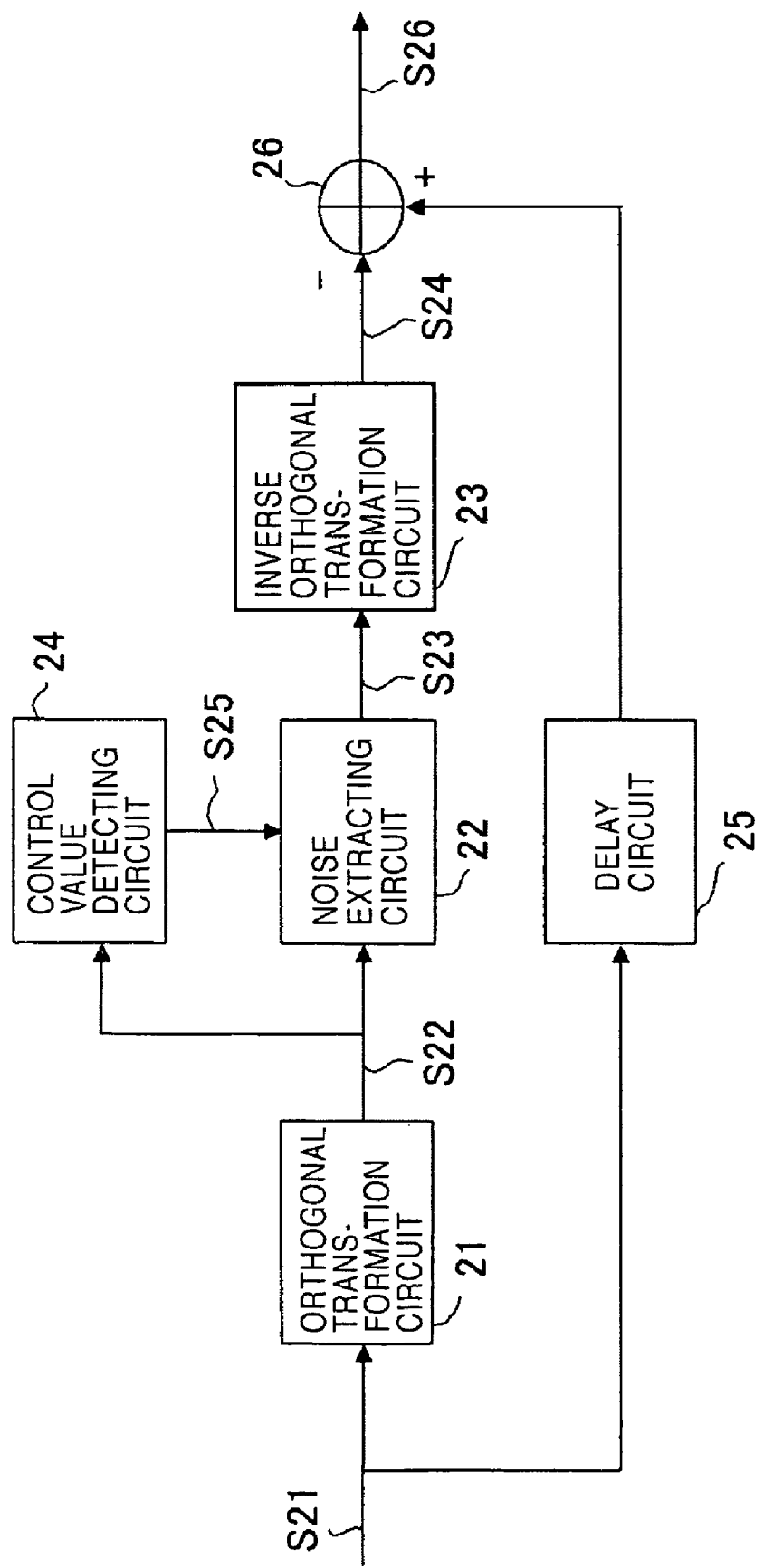
FIG. 7 is a schematic block diagram showing the second configuration of a noise eliminating apparatus.

Noise eliminating apparatuses can be broadly divided into the two types shown in FIGS. 6 and 7. FIG. 6 shows a noise eliminating apparatus that performs noise elimination by eliminating noise components from an orthogonal-transformed input and performing inverse orthogonal transformation on the noise components. In other words, it may be said that this type of noise eliminating apparatus is an apparatus based on a system eliminating noise on a frequency coordinate plane.

The noise eliminating apparatus shown in FIG. 6 includes an orthogonal transformation circuit 11, a noise eliminating circuit 12, an inverse orthogonal transformation circuit 13, and a control value detecting circuit 14. Details of these circuits are described later.

FIG. 7 shows a type of noise eliminating apparatus which performs noise elimination by extracting noise components from an orthogonally transformed input, performing inverse orthogonal transformation on the noise components, and subtracting the inversely orthogonal transformed noise components from the input signal, which is delayed.

In other words, it may be said that the noise eliminating apparatus in FIG. 7 is a type of apparatus that eliminates noise on a spatial coordinate plane. The noise eliminating apparatus in FIG. 7 includes an orthogonal transformation circuit 21, a noise extracting circuit 22, an inverse orthogonal transformation circuit 23, a control value detecting circuit 24, a delay circuit 25, and a subtracting circuit 26. Details of these circuits are described later.

II. First Embodiment

The noise eliminating apparatus, which is in accordance with a first embodiment of the present invention, is described below.

i) Configurations of Circuits

In the first embodiment, a video signal S11 input to the orthogonal transformation circuit 11 is a signal representing, for example, three channels corresponding to red (R), green (G), and blue (B). In this case, noise eliminating processing is performed for each channel. When a luminance signal is used to detect a control value, a luminance signal needs to be generated from three channels corresponding to red, green, and blue.

In another form of the embodiment, the video signal S11 input to the orthogonal transformation circuit 11 may be a luminance signal. In this case, noise eliminating processing is performed on the luminance signal, and control value detection is also performed for the luminance signal.

For example, a discrete cosine transform (DCT) circuit is used as the orthogonal transformation circuit 11. A video signal is input to the orthogonal transformation circuit 11. Its transforming calculation transforms the video signal from a value in time domain into a value in frequency domain. The DCT circuit is characterized by high accuracy of transformation to the frequency domain.

The orthogonal transformation circuit 11 includes a line memory for forming an image block having an m×n size, and another storage circuit. Orthogonal transformation in the orthogonal transformation circuit 11 is performed on an image block having an m×n size.

The orthogonal transformation circuit 11 only needs to output a value obtained by transforming the input video signal S11 from time domain into frequency domain. Therefore, another transformation system may be used for transformation. For example, an Hadamard transform circuit and a Haar transform circuit may be used. The use of these circuits produces an advantage of circuit size smaller than that of a DCT circuit.

The inverse orthogonal transformation circuit 13 performs calculation of inverse orthogonal transformation with respect to the orthogonal transformation circuit 11. Accordingly, when a DCT circuit is used as the orthogonal transformation circuit 11, an inverse DCT circuit is used as the inverse orthogonal transformation circuit 13. Similarly, when an Hadamard transform circuit is used as the orthogonal transformation circuit 11, an inverse Hadamard transform circuit is used as the inverse orthogonal transformation circuit 13. When a Haar transform circuit is used as the orthogonal transformation circuit 11, an inverse Haar transform circuit is used as the inverse orthogonal transformation circuit 13. Also, the inverse orthogonal transformation circuit 13 includes a line memory for generating an image having an m×n size, and another storage circuit.

Figure 8:
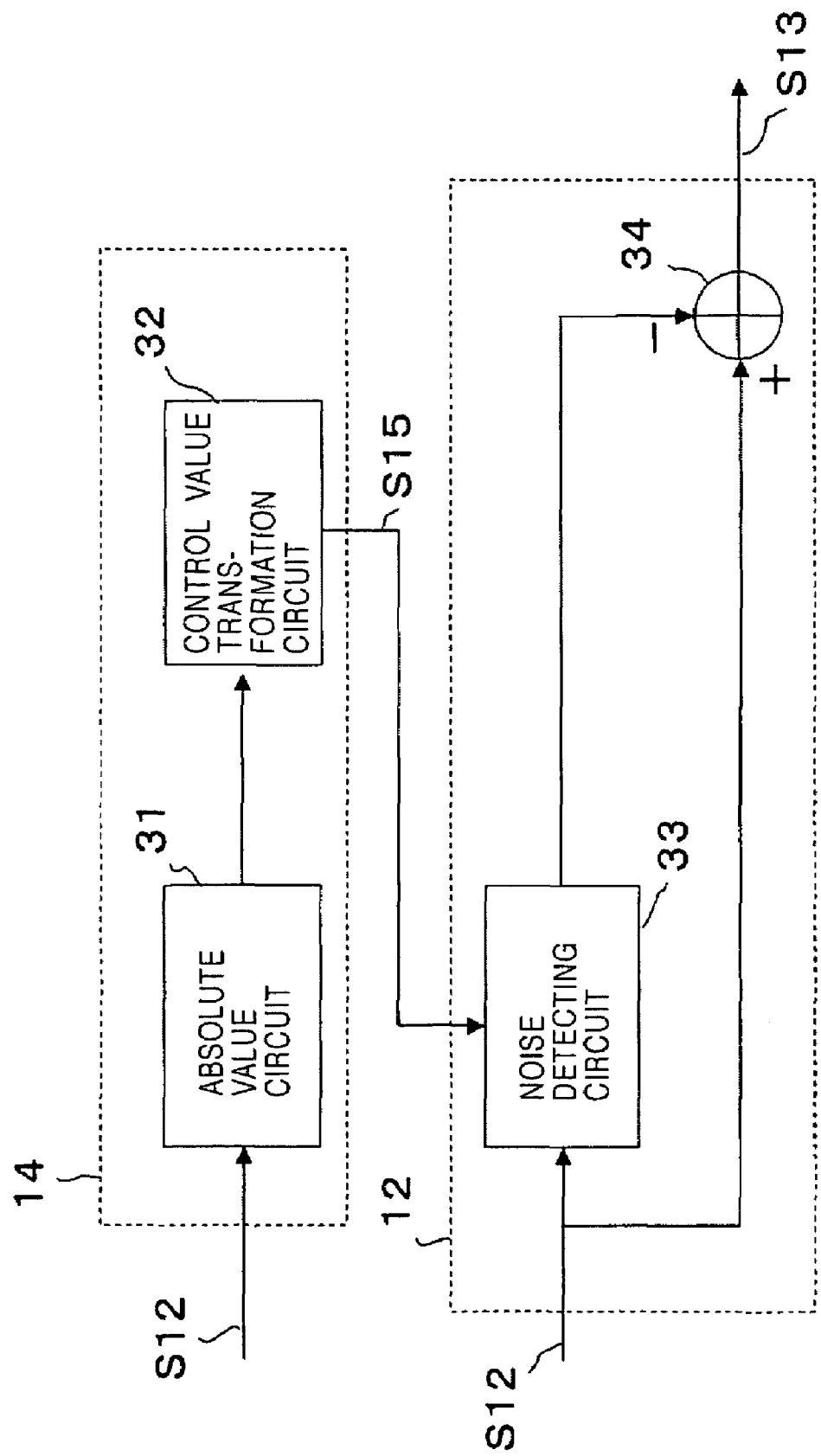
FIG. 8 is a detailed block diagram showing the noise eliminating apparatus shown in FIG. 6.

As described above, orthogonal transformation and inverse orthogonal transformation are performed for an image block having an m×n size. The inverse orthogonal transformation circuit 13 outputs a noise-eliminated video signal S14, which is the result of inverse orthogonal transformation. The noise eliminating circuit 12 and the control value detecting circuit 14 have the configurations shown in FIG. 8. The control value detecting circuit 14 receives, as components to be detected, input frequency components S12 which are obtained by orthogonal transformation.

The control value detecting circuit 14 is realized by, for example, an absolute value circuit 31 and a control value transformation circuit 32 that converts a detected absolute value into a control signal.

The absolute value circuit 31 detects the absolute value of a signal level from each input frequency component. The absolute value circuit 31 detects a luminance level or each channel signal level from DC components among the frequency components. The absolute value circuit 31 detects vertically positioned edge components from horizontal AC components, horizontally positioned edge components from vertical AC components, and obliquely positioned edge components from oblique AC components.

The control value transformation circuit 32 transforms the detected signal level or the value of each detected edge component into a control value transforming the form of the coring function. For example, the control value transformation circuit 32 performs transformation into a control value on the basis of the input-to-output relationship shown in FIG. 9 which has a negative gradient.

Figure 9:
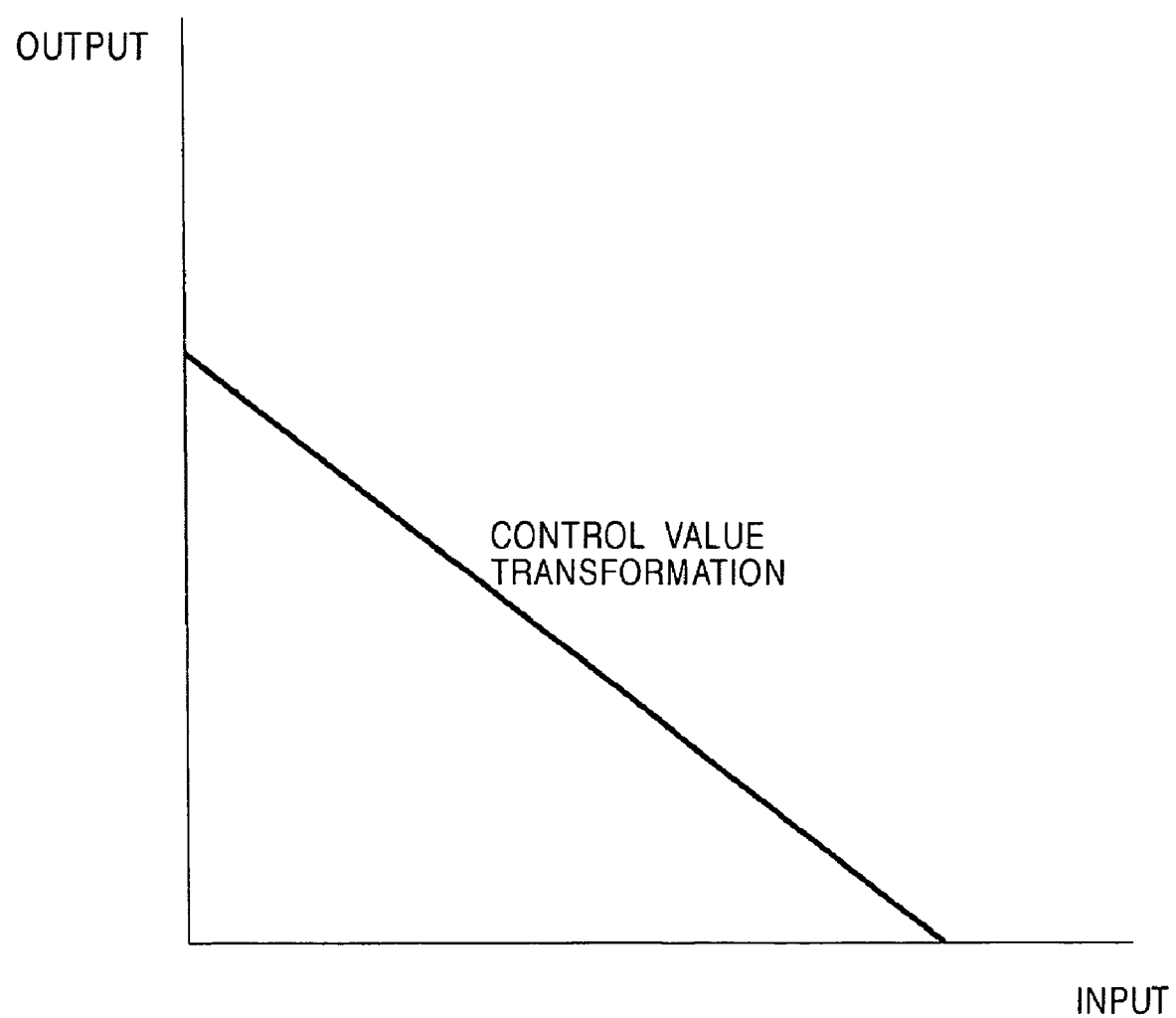
FIG. 9 is a graph showing an example of a control value transformation characteristic.

The input-to-output relationship in FIG. 9 reflects general characteristics in which noise is easily recognized when the average luminance level in image block is small. Accordingly, a function of the transformation shown in FIG. 9 gives a negative gradient so that input frequency components are directly used as a noise eliminating signal.

The input-to-output relationship in FIG. 9 indicates that, when small edge components are included, noise is eliminated by a control value set by a luminance level, while, when large edge components are included, an intensity is decreased compared with a control value set by a luminance level in order to allow the edge components to remain.

Therefore, in the first embodiment, by adding, in a predetermined ratio, a first control value set from the luminance level or the level of each channel signal, and a second control value from edge components in directions, the sum is generated as a new control value. As the predetermined ratio, an appropriate value is used with reference to experience and experiment. A technique of adjusting the two control values is not addition, but may be calculation such as multiplication.

The noise eliminating circuit 12 eliminates noise on a frequency coordinate plane. For example, when the level of an image signal is small, the noise eliminating circuit 12 regards the image signal as noise and eliminates the noise. Conversely, when the level of an image signal is large, the noise eliminating circuit 12 regards the image signal as not noise, the noise eliminating circuit 12 serves to store the image signal. The noise eliminating circuit 12 receives, as an input, the frequency components S12, which are output from the orthogonal transformation circuit 11. As shown in, for example, FIG. 8, the noise eliminating circuit 12 is realized by a noise detecting circuit 33 and a subtracting circuit 34.

Figure 10:
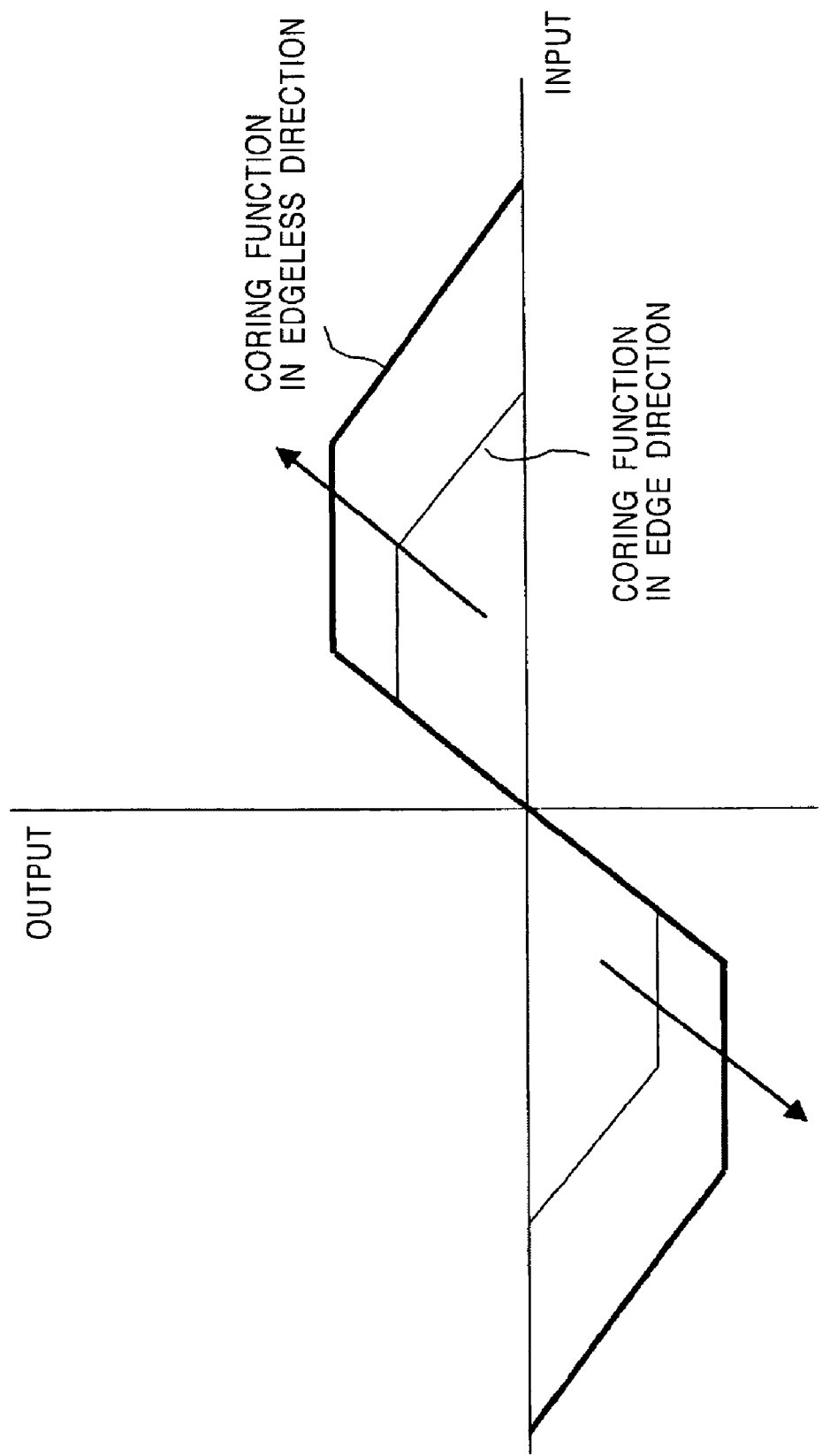
FIG. 10 is a graph showing switching of coring functions in response to edge detection.

The noise detecting circuit 33 extracts noise components from frequency components by using coring functions represented by the forms shown in, for example, FIG. 10. The (input-to-output-characteristic) coring functions represented by the forms in FIG. 10 indicate that, at a small input value, an output value proportional to the input value appears, and that the output value becomes constant irrespective of an increase/decrease in input value, and decreases when the input further increases. Based on the input-to-output relationship, only noise components having small signal level are extracted.

The input-to-output relationship in the noise detecting circuit 33, that is, the forms representing the coring functions, are variably controlled in accordance with a control value S15. If edge components are detected in the horizontal direction (i.e., when low AC components in the horizontal direction have large values), the forms representing the coring functions are controlled so as to be large for the other directions (the vertical direction and the oblique direction).

The arrows shown in FIG. 10 indicate the above relationship. Accordingly, more components in the vertical and oblique directions are extracted as noise components (noise canceling components). The forms representing the coring functions can be controlled to be directed in the directions reverse to the shown arrows, which are not shown. In this case, the noise components extracted in the vertical and oblique directions can be more decreased.

Obviously, a direction in which edge components are detected is not limited to the horizontal direction. In response to the direction detected, corresponding relationships between the forms representing the coring functions are switched.

Control of transformation of one coring function (concerning one direction) in response to the result of edge detection in another direction may be limited to a direction in which an edge representing value is zero among vertical and oblique directions. In other words, only in the case of detecting no edge in one direction, a coring function concerning the direction may be controlled so that the value represented by the coring function is increased.

The subtracting circuit 34 subtracts, from the frequency components from which noise components are to be detected, the noise components (noise canceling components) detected as described above by the noise detecting circuit 33. The result of subtraction is output, as a frequency domain signal S13 with noise canceled therein, to the inverse orthogonal transformation circuit 13.

ii) Noise Eliminating Operation

Next, a process of the noise eliminating apparatus according to the first embodiment is described below.

In the first embodiment, the three-channel (RGB) video signal S11 is input to the orthogonal transformation circuit 11. The orthogonal transformation circuit 11 uses the line memory to divide the video signal into blocks and transforms the blocks into frequency domain values.

Orthogonal transformation is performed in units of blocks in each of the horizontal and vertical directions. The output results are given as components in two-dimensional frequency domain. For example, assuming that one block of image has a size of 4 vertical pixels and 8 horizontal pixels (i.e., 4×8 size), frequency components S12 having the arrangement shown in FIG. 2 are obtained.

The obtained frequency components have the following tendency. Noise disperses as plural frequency components representing small values. Those other than the noise concentrate on low and particular frequency components representing large values. The noise eliminating circuit 12 uses this tendency to treat the small values as noise, and eliminates the noise. This processing is performed for each frequency components.

The control value detecting circuit 14 performs the following process. As described above, the frequency components S12, obtained by orthogonally transforming the video signal in units of blocks, are input to the control value detecting circuit 14.

Figure 11:
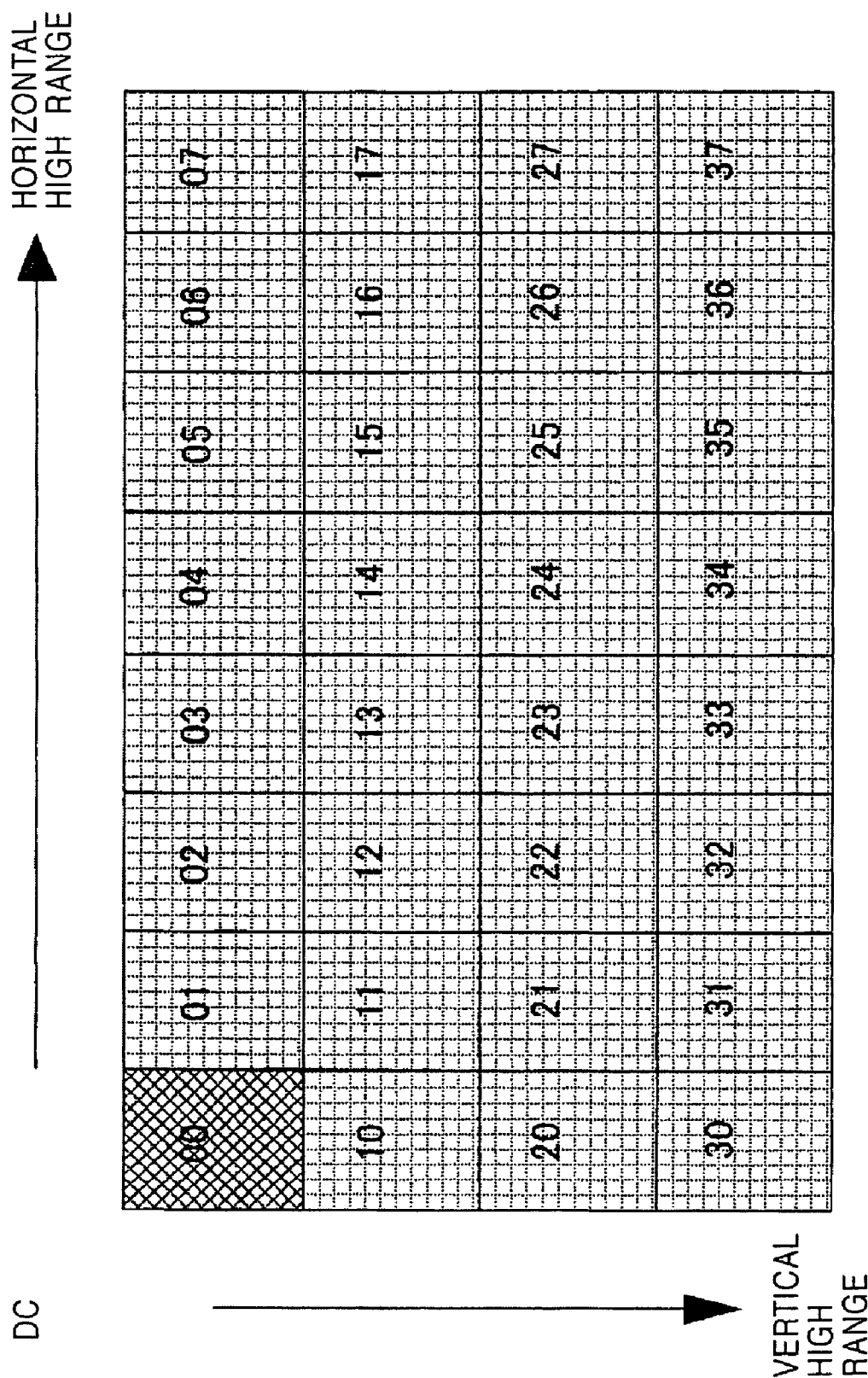
FIG. 11 is a conceptual diagram showing noise detection based on a direct-current (DC) component and a control range thereby.

When control value detection is performed in luminance level, from a DC component (the component (00) shown in FIG. 11) for each channel of R, G, and B, by performing calculation to generate a luminance, a control value is obtained.

When control value detection is performed in signal level for each channel of R, G, and B, from a DC component (the component (00) shown in FIG. 2), a control value is directly obtained. The component (00) shown in FIG. 2 has zero or a positive value.

In the case of the noise eliminating apparatus shown in FIG. 6, for control based on a luminance signal, the amount of noise elimination is suppressed in high luminance level, and more noise is eliminated in low luminance level. Similarly, for control based on the signal level of each channel (R, G, or B), the amount of noise elimination is suppressed in high signal level, and more noise is eliminated in low signal level.

Conversely, in control by the noise eliminating apparatus, noise elimination is more strongly performed in high luminance level and high signal level, and noise elimination is suppressed in low luminance level and low signal level. The control is selected in a case in which noise elimination in low luminance level or the like will not produce sufficient improvement in image quality.

Although the present invention determines a control value based on low AC components obtained by orthogonal transformation, it can determine the control value based on only the luminance level or the signal level of each channel. In this case, all the frequency components (AC components) excluding the component (00), which is hatched in FIG. 11, are to be processed.

In this embodiment, the absolute value of the component (00), which is to be detected, is found by the absolute value circuit 31. The control value transformation circuit 32 performs control value transformation so that, the greater the level of the video signal, the smaller the extracted noise canceling components.

The control value transformation in FIG. 9 indicates a case in which transformation is controlled so that the amount of noise elimination (in high signal level) can be suppressed. By changing the gradient shown in FIG. 9 from negative to positive, transformation is controlled so that the amount of noise elimination (in low signal level) can be suppressed.

The control value detecting circuit 14 in this embodiment determines the presence of an in-block edge from the AC components. Also in this case, for control value diction in luminance level, frequency components are extracted from RGB channels, and luminance signals are generated for the frequency components and are used for detection. Otherwise, control value detection is performed for each of RGB channels.

Figure 12:
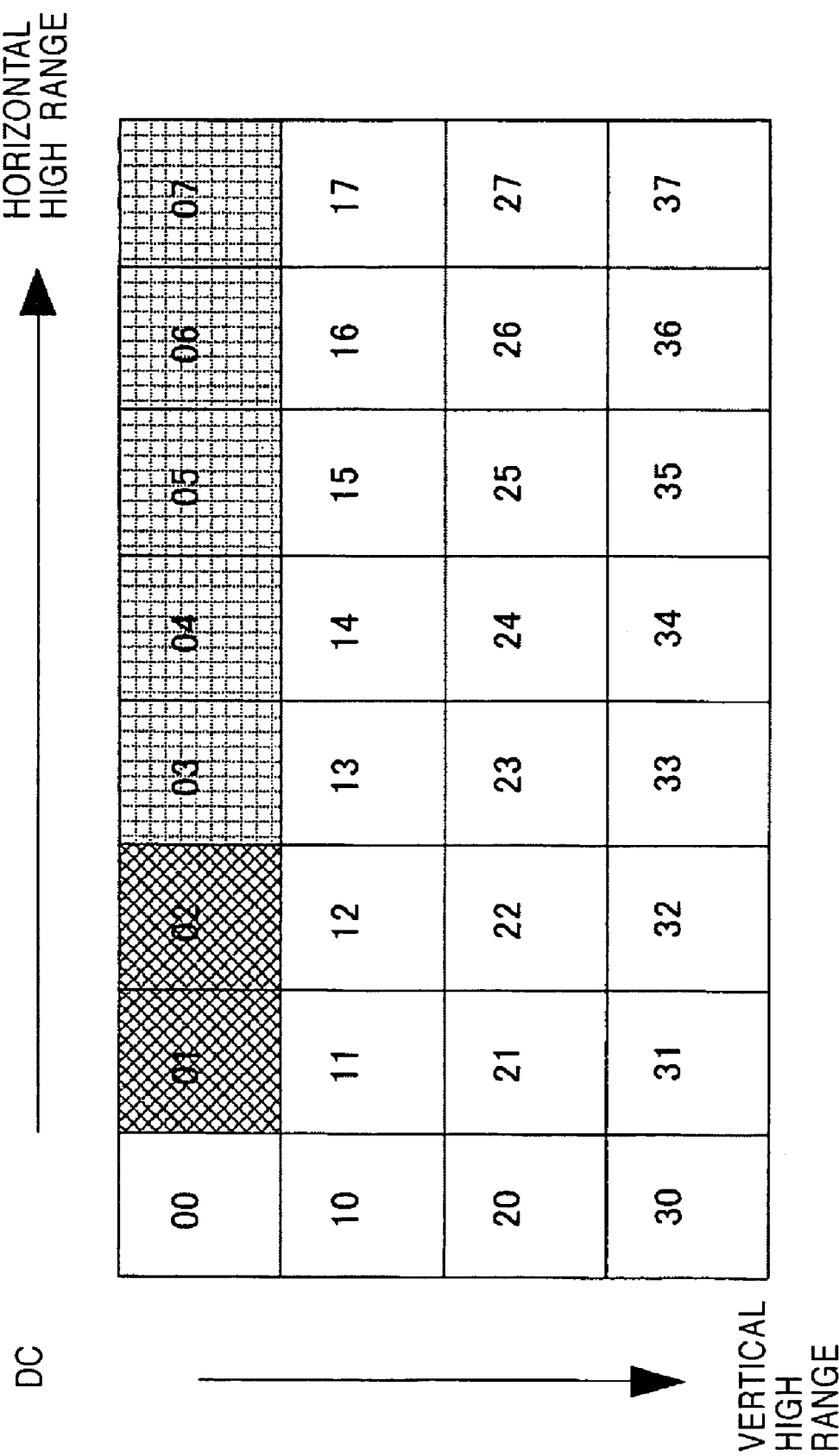
FIG. 12 is a conceptual diagram showing horizontal edge detection and a control range thereby.

For example, as FIG. 12 shows, the absolute values of the low AC components (01) and (02) are added up. If the sum is large, it is determined that the block has therein vertically positioned edge components, and a control value for horizontal components is decreased.

In this case, frequency components from which noise canceling components are to be weakly extracted are the frequency components (01) to (07). In addition, for example, by performing control so as to increase a control value for other components, for example, vertical components, the control value transformation circuit 32 cancels noise while storing an edge.

Specifically, the control value is set so that the coring function represented by the thin line shown in FIG. 10 is used for horizontal frequency components from which edge components are detected. In addition, the control value is set so that the coring function represented by the thick line (in FIG. 10) is used for vertical and oblique directions in which no edge components are detected.

This indicates that noise components (noise canceling components) detected in the horizontal direction in which the edge components are detected are smaller than noise components (noise canceling components) detected in the vertical and oblique directions in which no edge components are detected. As a result, signal components eliminated in the subtracting circuit 34 decreases, thus leading to storage of the edge components.

Figure 13:
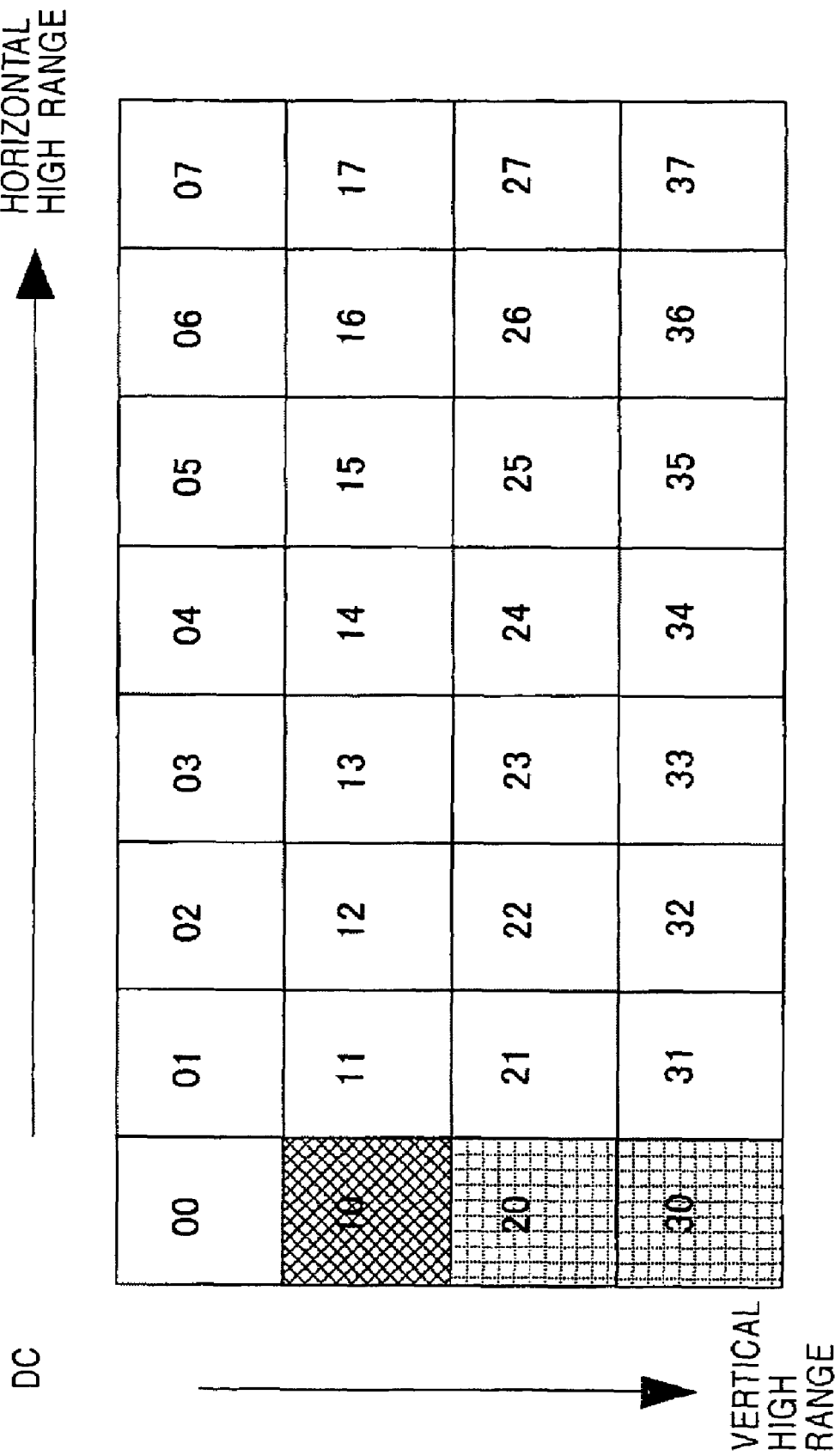
FIG. 13 is a conceptual diagram showing vertical edge detection and a control range thereby.

Similarly, for example, as FIG. 13 shows, if the absolute value of the low AC component (10) is large, it is determined that the image block has therein horizontally positioned edge components. Based on the determination, the noise eliminating apparatus is controlled so that extraction of noise canceling components for the vertical components is weakened.

In this case, frequency components whose extraction is weakened are the vertical AC components (10) to (30). At the same time, for example, by enhancing extraction of noise canceling components for the horizontal direction, the noise eliminating apparatus operates so that the noise components are effectively eliminated while storing the edge components.

Figure 14:
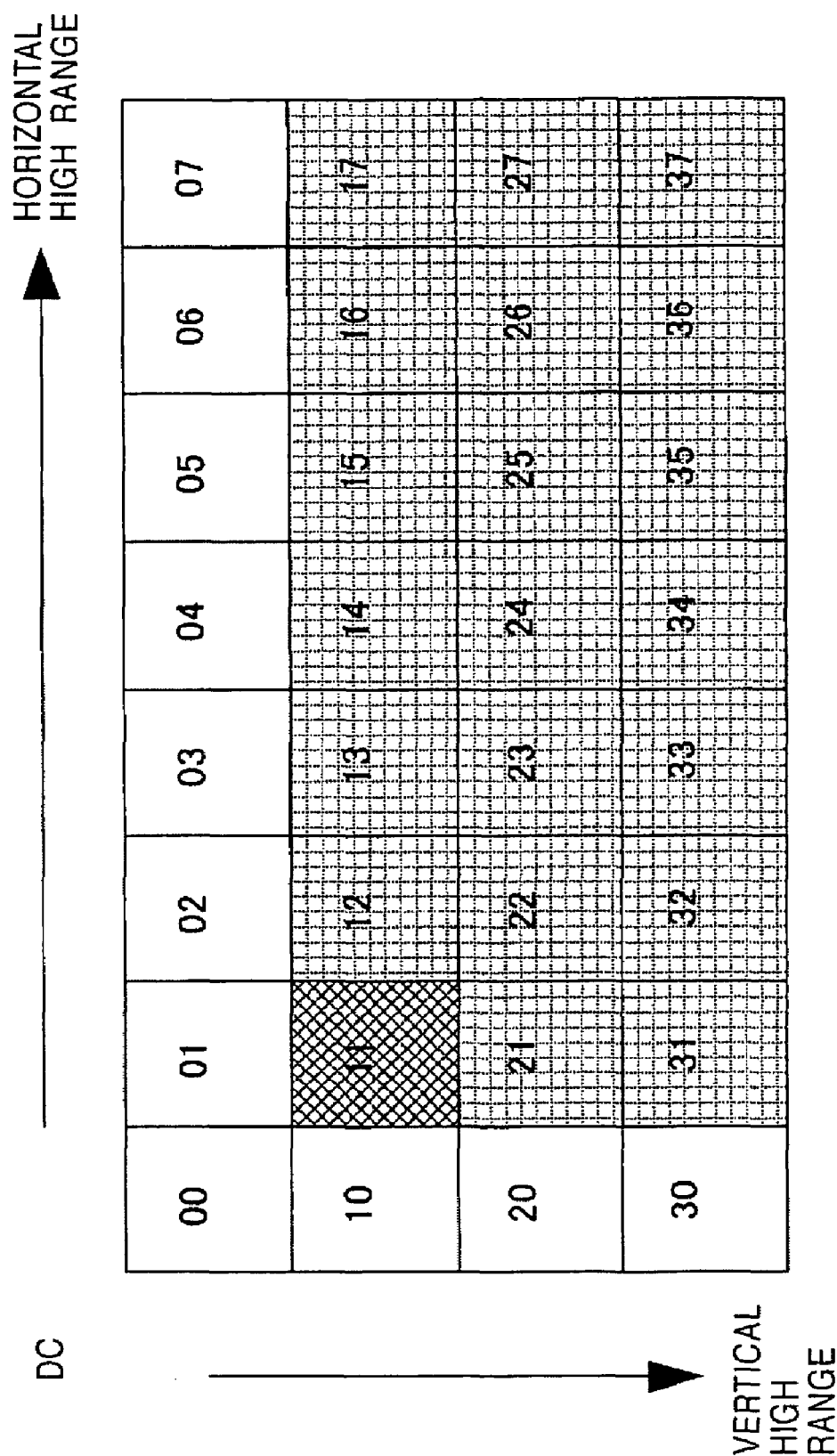
FIG. 14 is a conceptual diagram showing oblique edge detection and a control range thereby.

This also applies to the oblique components. For example, when the absolute value of the low AC component (11) in the oblique direction is large as shown in FIG. 14, it is determined that the image block has therein obliquely positioned edge components. Based on the determination, the noise eliminating apparatus is controlled so that extraction of noise components for the oblique components is weakened.

In this case, frequency components to be weakened are the AC components (11) to (17), (21) to (27), and (31) to (37) in the oblique direction. At the same time, for example, by enhancing extraction of noise canceling components for other components, for example, components in the horizontal and vertical directions, storage of the edge components and elimination of the noise components are achieved.

iii) Advantages of First Embodiment

In the first embodiment, in units of blocks in orthogonal transformation, in accordance with a luminance level or the level of each channel signal, by controlling the noise eliminating apparatus so that the amount of extraction of noise components (noise canceling components) is increased for a low luminance level (low signal level), while the amount of extraction of noise components (noise canceling components) is decreased for a high luminance level (high signal level), noise easily recognizable in low luminance level (low signal level) is suppressed and storage of edge components in high luminance level (high signal level) is performed. These enable improvement in superficial sense of noise and reduction in image blurring.

In the first embodiment, by using a DC component obtained by orthogonal transformation, as a luminance level or the signal level of each channel, for a noise-component control value, the need to provide a dedicated level detecting circuit for a luminance level or each channel signal is eliminated, thus enabling small circuit size.

In addition, in the first embodiment, by extracting, in a block unit for orthogonal transformation, image-edge components from AC components of the block, weakening extraction of noise components for components in a direction including edge components, and enhancing extraction of noise components for components in the other directions, noise can be suppressed while storing the edge components. This enables improvement in a superficial sense of noise.

In the first embodiment, by extracting image-edge components from AC components obtained by orthogonal transformation, and using the extracted components for noise elimination, the need to provide a dedicated edge detecting circuit can be eliminated, thus enabling a small circuit size.

In the first embodiment, extraction of noise components is controlled in combination of, in units of blocks for orthogonal transformation, a luminance level or the signal level of each channel, and edge-component information (the presence of edge components, and an edge direction if there are edge components). Thus, a superficial sense of noise can be improved compared with the case of controlling extraction of noise components by separately using the luminance level or the signal level of each channel, and the edge-component information.

III. Second Embodiment

Next, a noise eliminating apparatus according to a second embodiment of the present invention is described below with reference to FIG. 7.

i) Configurations of Component Circuits

In the second embodiment, detected noise components (noise canceling components) are canceled after inverse orthogonal transformation.

The noise eliminating apparatus according to the second embodiment does not differ from that according to the first embodiment in extracting noise components (noise canceling components) from frequency components obtained after orthogonal transformation, although both have different positions of cancellation. Accordingly, the noise eliminating apparatus according to the second embodiment has many component elements common to those of the noise eliminating apparatus according to the first embodiment. For example, an orthogonal transformation circuit 21 and a control value detecting circuit 24 are identical to those in the noise eliminating apparatus according to the first embodiment.

One of differences from the first embodiment is that a noise extracting circuit 22 is used in the second embodiment. The noise extracting circuit 22 is used to extract only noise components on a frequency coordinate plane. For example, when an input signal (video signal S21) is small, the noise extracting circuit 22 regards the signal as noise, and extracts the signal. Conversely, when the input signal is large, the noise extracting circuit 22 regards the signal as not noise, and operates so as not to extract the signal.

Figure 15:
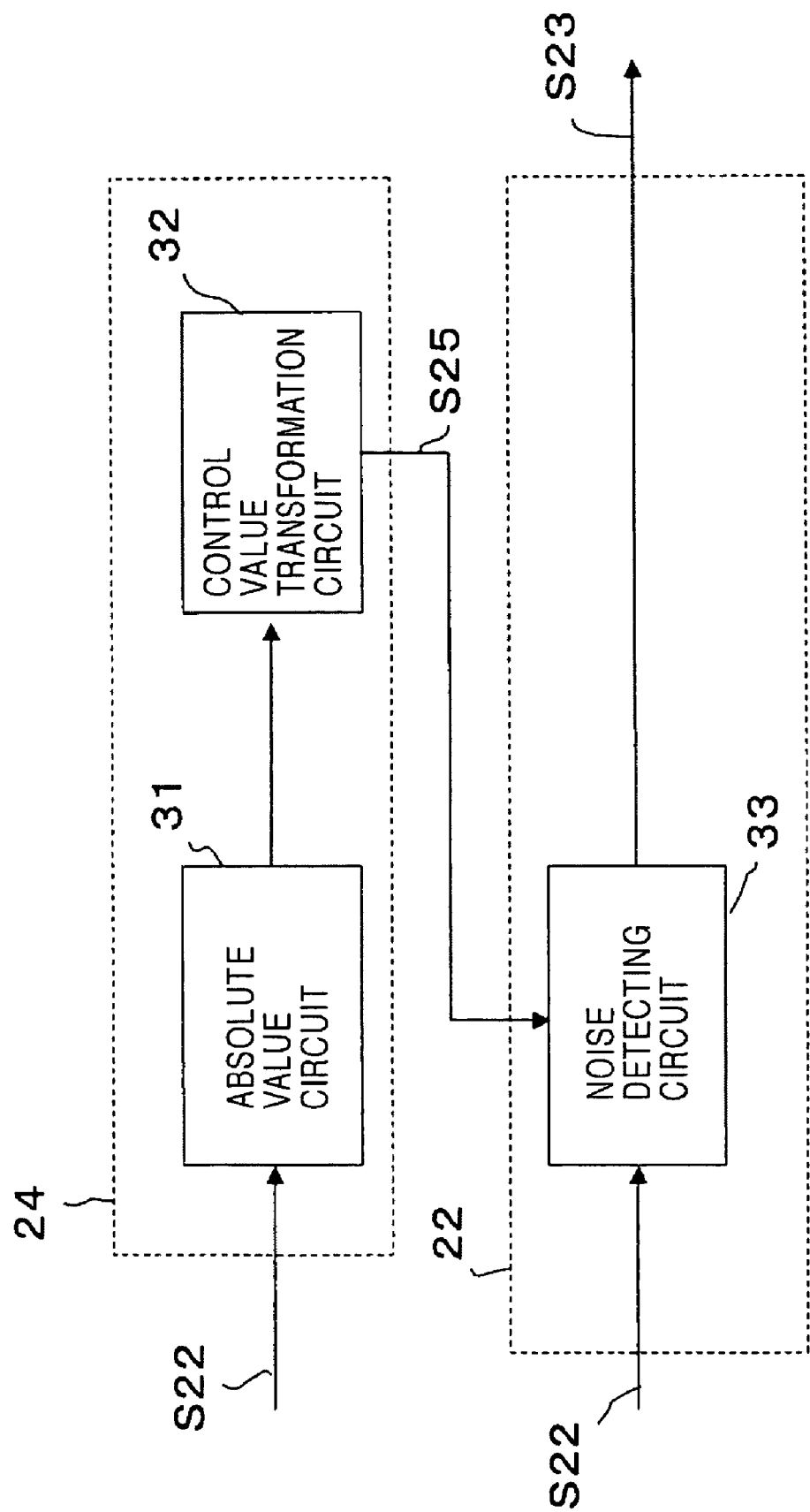
FIG. 15 is a detailed block diagram showing the noise eliminating apparatus shown in FIG. 7.

As FIG. 15 shows, the noise extracting circuit 22 is realized by the noise detecting circuit 33 described in the first embodiment. Therefore, based on control value S25, the noise detecting circuit 33 transforms forms representing coring functions, and outputs detected noise components (noise canceling components) S23 to a post-stage.

The inverse orthogonal transformation circuit 23 operates to inversely transform the noise components S23 onto a spatial coordinate plane. The results of transformation are output as noise canceling components S24. In the second embodiment, a delay circuit 25 is used. The delay circuit 25 is used to delay the input signal S21 until the noise canceling components S24 are extracted as spatial coordinate components.

A subtracting circuit 26 is used to subtract, from the video signal S21 delayed by the delay circuit 25, the noise canceling components S24 transformed into components on the spatial coordinate plane. This causes the subtracting circuit 26 to output a video signal S26 with noise components eliminated therein.

ii) Noise Eliminating Operation

Next, the operation of the noise eliminating apparatus according to the second embodiment is described below.

Also in the second embodiment, the video signal S21 is input as a three-channel (RGB) video signal to the orthogonal transformation circuit 21. The orthogonal transformation circuit 21 uses a line memory to divide the video signal S1 into blocks, and transforms each block into values in frequency domain.

The frequency components S22, obtained by orthogonal transformation, are input to the noise extracting circuit 22. In the control value detecting circuit 24, for control based on a luminance signal, the amount of extraction of noise components is suppressed in high luminance level, and extraction of more noise components is performed in low luminance level.

Similarly, for control based on the signal level of each channel (R, G, or B), the amount of extraction of noise components is suppressed in high signal level, and more noise components are extracted in low signal level. Obviously, also in this case, the above relationship in control can be reversed.

In the second embodiment, the absolute value circuit 31 finds the absolute value of the component (00) to be detected. The control value transformation circuit 32 performs control value transformation so that, the greater the level of the video signal S21, the smaller the noise canceling components S23.

The control value transformation shown in FIG. 9 corresponds to a case in which the amount of extraction of noise components in high luminance level (high signal level) is suppressed. Obviously, by changing the gradient to be from negative to positive, the amount of extraction of noise components in low luminance level (low signal level) can be suppressed.

Also in the second embodiment, from AC components, a control value detecting circuit 24 determines whether the block includes edge components. Also in this case, for control value control in luminance signal level, frequency components are extracted from the RGB channels, and luminance signals are generated for the frequency components, and are used for detection. Otherwise, control value detection is performed for each of the RGB channels.

As shown in, for example, FIG. 12, the absolute values of the low AC components (01) and (02) are added up. If the sum is large, it is determined that the block includes vertically positioned edge components, and a control value for frequency components in the horizontal direction is decreased.

In this case, frequency components from which noise canceling components are to be weakly extracted are the frequency components (00) to (07). The control value transformation circuit 32 cancels the noise components while storing the edge components, for example, by performing control so that a control value for other components, for example, vertical components is increased.

Specifically, for frequency components in the horizontal direction in which edge components are detected, a control value is set so that the coring function represented by the thin line shown in FIG. 10 is used. In addition, for frequency components in the vertical and oblique directions in which no noise components are detected, a control value is set so that the thick line shown in FIG. 10 is used.

This indicates that noise components (noise canceling components) extracted in the horizontal direction in which edge components are extracted are smaller than noise components (noise canceling components) extracted in the vertical and oblique directions in which no edge components are detected. As a result, the signal components eliminated by the subtracting circuit 34 decrease, thus leading to storage of the edge components.

Similarly, as shown in, for example, FIG. 13, when the absolute value of the low AC component (10) is large, it is determined that the image block has therein horizontally positioned edge components. Based on the determination, the noise eliminating apparatus is controlled so that the amount of extraction of noise canceling components for vertical components is reduced.

In this case, frequency components whose extraction amount is reduced are the vertical frequency components (10) to (30). At the same time, the noise eliminating apparatus operates so that noise components can be effectively eliminated, while storing the edge components, by enhancing extraction of noise canceling components for the horizontal components.

This also applies to oblique components. For example, as shown in FIG. 14, when the absolute value of the oblique low AC component (11) is large, it is determined that the image block has therein obliquely positioned edge components, the noise eliminating apparatus is controlled so that extraction of the noise components for one oblique component can be weakened.

In this case, frequency components to be weakened are the frequency components (10) to (17), (21) to (27), and (31) to (37) in the oblique direction. At the same time, for example, by enhancing extraction of noise canceling components for other components, for example, components in the horizontal and vertical directions, storage of the edge components and elimination of noise are achieved.

The noise canceling components S23 extracted as described above are transformed into noise canceling components S24 as spatial coordinate components by the inverse orthogonal transformation circuit 23. The obtained components are supplied to the subtracting unit 26. The noise canceling components S24 are subtracted from the video signal S21 in a state delayed by the delay circuit 25. This eliminates the noise.

iii) Advantages of Second Embodiment

Also in the second embodiment, advantages similar to those in the first embodiment are realized. In other words, in the first embodiment, in units of blocks in orthogonal transformation, in accordance with a luminance level or the level of each channel signal, by controlling the noise eliminating apparatus so that the amount of extraction of noise components (noise canceling components) is increased for a low luminance level (low signal level), while the amount of extraction of noise components (noise canceling components) is decreased for a high luminance level (high signal level), noise easily recognizable in low luminance level (low signal level) is suppressed and storage of edge components in high luminance level (high signal level) is performed. These enable improvement in superficial sense of noise and reduction in image blurring.

In the first embodiment, by using a DC component obtained by orthogonal transformation, as a luminance level or the signal level of each channel, for a noise-component control value, the need to provide a dedicated level detecting circuit for a luminance level or each channel signal is eliminated, thus enabling small circuit size.

In the second embodiment, by extracting, in a block unit for orthogonal transformation, image-edge components from AC components of the block, weakening extraction of noise components for components in a direction including edge components, and enhancing extraction of noise components for components in the other directions, noise can be suppressed while storing edge components. This enables improvement in a superficial sense of noise.

In the second embodiment, by extracting image-edge components from AC components obtained by orthogonal transformation, and using the extracted components for noise elimination, the need to provide a dedicated edge detecting circuit can be eliminated, thus enabling a small circuit size.

In the second embodiment, extraction of noise components is controlled in combination of, in units of blocks for orthogonal transformation, a luminance level or the signal level of each channel, and edge-component information (the presence of edge components, and an edge direction if there are edge components). Thus, a superficial sense of noise can be improved compared with the case of controlling extraction of noise components by separately using the luminance level or the signal level of each channel, and the edge-component information.

IV. Other Embodiments

In the two embodiments described above, each image block has a 4×8 size. However, the block size is not limited to the 4×8 size. In the above-described embodiments, control value detection is performed for each of the components (00), (01), (02), (10), and (11). However, other frequency components may be used as frequency components to be detected. In addition, the results of calculations among plural frequency components may be used as frequency components to be detected.

Although, in the above-described embodiment, frequency components to be controlled are set as shown in FIGS. 1 to 14, a range to be controlled may be other frequency components. For example, some of frequency components from which edge components are detected may be used as frequency components to be controlled.

In the above-described embodiments, a case in which the form of a coring function is directly controlled by using a control value. However, the form of the coring function may be fixed, and extracted noise components (noise canceling components) may be controlled to increase or decreases. A circuit configuration in this case is shown in FIGS. 16 and 17.

Figure 16:
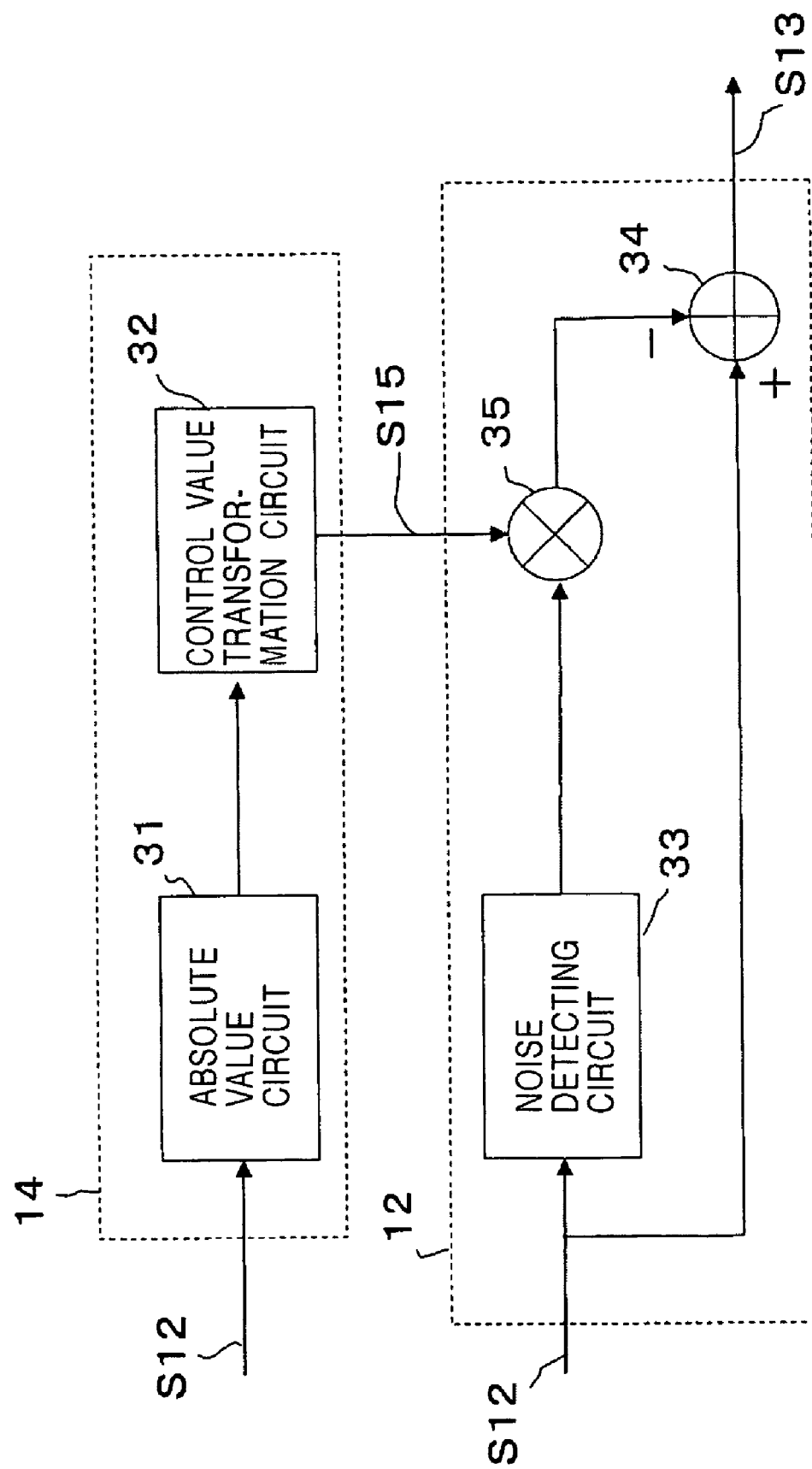
FIG. 16 is a block diagram showing another embodiment of the noise eliminating apparatus shown in FIG. 8.
Figure 17:
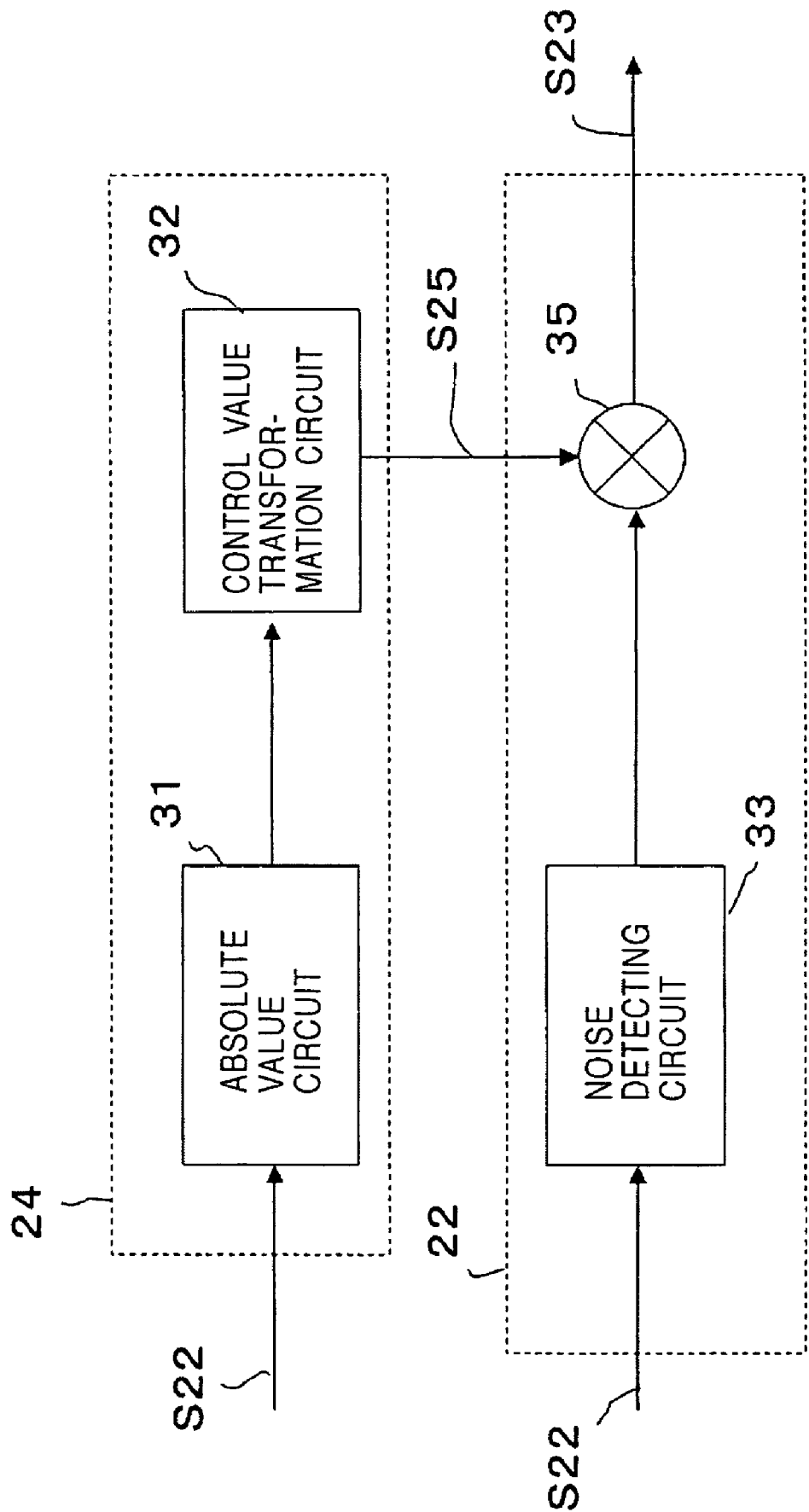
FIG. 17 is a block diagram showing the noise eliminating apparatus shown in FIG. 15.

FIG. 16 shows a modification of the system (first embodiment) of eliminating noise components from frequency components. FIG. 17 shows a modification of the system (second embodiment) of eliminating noise components after performing inverse orthogonal transformation. FIGS. 16 and 17 correspond to FIGS. 8 and 15, respectively. As described above, in the cases shown in FIGS. 16 and 17, the forms of coring functions are fixed. Thus, both modifications differ from the first and second embodiments in that the control values S15 and S25 output from the control value transformation circuits 32 are supplied to multipliers 35.

The control values themselves are similar to those in the above-described embodiments. Thus, the output of each multiplier 35 is such that the degree of amplification or attenuation of noise components detected in the noise detecting circuit 33 is switched. For example, when edge components are detected in the horizontal direction, the degree of amplification for horizontal frequency components is decreased than that for frequency components in other directions. Also this manner enables both storage of edge components and suppression of noise components.

The present invention can be applied to, for example, video recording apparatuses such as video cameras, videocassette recorders, disk recorders, video playback apparatuses such as video players and disk players, video output apparatuses (including portable terminals and information terminals having video display functions) such as printers and television receivers, and other types of video input/output apparatuses.

What is claimed is:

1. A noise eliminating apparatus comprising:
   a first unit for detecting low alternating-current frequency components from frequency components obtained by orthogonally transforming an image signal in rectangular units;
   a second unit for detecting, from the low alternating-current frequency components, edge components corresponding to the low alternating-current frequency components, the edge components being included in an image in one rectangular unit; and
   a third unit for controlling a first control value to be less than a second control value, the first control value being used to act on frequency components in a direction in which the detected edge components are included in the image, the second control value being used to act on frequency components in directions other than said direction, wherein noise in the image is eliminated by using noise canceling components obtained in the control.

2. The noise eliminating apparatus according to claim 1, further comprising:
   a fourth unit for extracting, by using a coring function transformed in response to the first control value, noise components from the frequency components obtained by orthogonally transforming the image signal in the rectangular units, and outputting the noise components as the noise canceling components.

3. The noise eliminating apparatus according to claim 1, further comprising:
   a fifth unit for detecting, based on a coring function, noise components from the frequency components obtained by orthogonally transforming the image signal in the rectangular units; and
   a sixth unit for allowing the first control value to act on the detected noise components, and outputting, as the noise canceling components, the noise components transformed in response to the first control value.

4. A noise eliminating method comprising:
   detecting low alternating-current frequency components from frequency components obtained by orthogonally transforming an image signal in rectangular units;
   detecting, from the low alternating-current frequency components, edge components corresponding to the low alternating-current frequency components, the edge components being included in an image in one rectangular unit;
   controlling a first control value to be less than a second control value, the first control value being used to act on frequency components in a direction in which the detected edge components are included in the image, the second control value being used to act on frequency components in directions other than said direction; and eliminating noise in the image by using noise canceling components obtained in the controlling.

5. A computer readable medium including computer executable instructions, wherein the instructions, when executed by a processor, cause the processor to perform a method comprising:

detecting low alternating-current frequency components from frequency components obtained by orthogonally transforming an image signal in rectangular units;

detecting, from the low alternating-current frequency components, edge components corresponding to the low alternating-current frequency components, the edge components being included in an image in one rectangular unit;

controlling a first control value to be less than a second control value, the first control value being used to act on frequency components in a direction in which the detected edge components are included in the image, the second control value being used to act on frequency components in directions other than said direction; and eliminating noise in the image by using noise canceling components obtained in the controlling.

6. The noise eliminating apparatus according to claim 1, wherein the third unit determines the first control value using a linear function.

7. The noise eliminating apparatus according to claim 1, wherein the third unit determines the first control value using a look-up table.

8. The noise eliminating apparatus according to claim 2, wherein the fourth unit transforms the coring function in a vertical direction based on the first control value.

9. The noise eliminating apparatus according to claim 2, wherein the fourth unit enlarges the coring function in a vertical direction based on the first control value.

10. A noise eliminating apparatus comprising:

a first detecting unit configured to detect low alternating-current frequency components from frequency components obtained by orthogonally transforming an image signal in rectangular units;

a second detecting unit configured to detect, from the low alternating-current frequency components, edge components corresponding to the low alternating-current frequency components, the edge components being included in an image in one rectangular unit; and a control unit configured to control a first control value to be less than a second control value, the first control value being used to act on frequency components in a direction in which the detected edge components are included in the image, the second control value being used to act on frequency components in directions other than said direction, wherein noise in the image is eliminated by using noise canceling components obtained by the control unit.

11. The noise eliminating apparatus according to claim 10, further comprising:

an extracting unit configured to extract, by using a coring function transformed in response to the first control value, noise components from the frequency components obtained by orthogonally transforming the image signal in the rectangular units, and outputting the noise components as the noise canceling components.

12. The noise eliminating apparatus according to claim 10, further comprising:

a third detecting unit configured to detect, based on a coring function, noise components from the frequency components obtained by orthogonally transforming the image signal in the rectangular units; and a computation unit configured to act on the detected noise components with the first control value, and to output, as the noise canceling components, the noise components transformed in response to the first control value.

13. The noise eliminating apparatus according to claim 10, wherein the control unit is configured to determine the first control value using a linear function.

14. The noise eliminating apparatus according to claim 10, wherein the control unit is configured to determine the first control value using a look-up table.

15. The noise eliminating apparatus according to claim 11, wherein the extracting unit is configured to transform the coring function in a vertical direction based on the first control value.

16. The noise eliminating apparatus according to claim 11, wherein the extracting unit is configured to enlarge the coring function in a vertical direction based on the first control value.

* * * * *